United States Patent [19]

Brim et al.

[11] Patent Number: 5,960,920
[45] Date of Patent: Oct. 5, 1999

[54] WEAR COMPENSATING FRICTION CLUTCH

[75] Inventors: Robert V. Brim, Lathrup Village; Honorio H. Cabotage, Ann Arbor, both of Mich.

[73] Assignee: Daikin Clutch Corporation, Belleville, Mich.

[21] Appl. No.: 08/686,420

[22] Filed: Jul. 26, 1996

[51] Int. Cl.$^6$ .................................................. F16D 13/75
[52] U.S. Cl. .................................... 192/70.25; 192/89.23; 192/111 A
[58] Field of Search ........................... 192/70.25, 111 A, 192/89.23, 89.25

[56] References Cited

U.S. PATENT DOCUMENTS

| | | | |
|---|---|---|---|
| 4,538,716 | 9/1985 | Reik | 192/89.25 X |
| 4,625,847 | 12/1986 | Maucher | 192/89.25 |
| 5,409,091 | 4/1995 | Reik et al. | 192/70.25 |
| 5,431,268 | 7/1995 | Mizukami et al. | 192/70.25 |
| 5,588,517 | 12/1996 | Kooy et al. | 192/70.25 |
| 5,632,365 | 5/1997 | Maucher | 192/70.25 |

*Primary Examiner*—Rodney H. Bonck
*Attorney, Agent, or Firm*—Raphael A. Monsanto; Benita J. Rohm

[57] ABSTRACT

A wear adjusting arrangement compensates for the wear of a clutch disc that is interposed axially between, and communicates frictionally with, a pressure plate and a flywheel of a vehicle. The pressure plate is urged by a diaphragm spring toward the clutch disc and the flywheel, and is pivotable about a fulcrum ring. The axial relationship of the fulcrum ring with respect to the pressure plate varies as the clutch disc wears. A fulcrum support element which is axially displaceable with respect to the pressure plate supports the fulcrum ring in fixed relation thereto. The arrangement also includes a bias actuator mechanism that communicates mechanically with the fulcrum support element. The bias actuator mechanism establishes an axially spatial relationship between the fulcrum support element and the pressure plate. The arrangement additionally includes a resilient biasing element arranged in communication with the fulcrum support element for applying a resilient biasing force to the fulcrum support element. The application of a force to the fulcrum support element which exceeds the resilient biasing force causes the bias actuator mechanism to be released whereby a predetermined axial relationship is established between the fulcrum support element and the pressure plate.

21 Claims, 3 Drawing Sheets

WEAR COMPENSATING FRICTION CLUTCH

BACKGROUND OF THE INVENTION

1. Field of the Invention

The present invention relates generally to friction clutches, and more specifically, to a friction clutch that automatically adjusts to maintain a desired clutch release load requirement and that compensates for the wear of various parts thereof, including the clutch disc.

2. Description of the Related Art

In a known friction clutch arrangement of the type that is not automatically adjustable, the release force required to disengage the clutch changes over the life of the clutch. As the friction surfaces of the clutch disc and other parts of the clutch become worn, the relative position of the pressure plate changes with respect to the diaphragm spring.

These changing relationships coupled with the characteristics of an axially stressed diaphragm spring typically cause the release force required to disengage the clutch to increase over time. If the clutch is not adjusted to compensate for the relative movement of the fulcrums, the release force required to disengage the clutch will increase to a point at which the clutch may be rendered unusable by some individuals.

Consequently, the wearing of the friction surfaces in a clutch arrangement results in a varying release force requirement over the life of the clutch, in addition to limiting the life of the clutch arrangement. Additionally, in known clutch arrangements that do not adjust automatically, the thickness dimension of the clutch disc is critical to the proper operation of the clutch. This results in manufacturing requirements that are costly and difficult to achieve.

The prior art references has endeavored to overcome the above-referenced problems by providing self-adjusting clutches. In one known arrangement, a self-adjusting mechanism for a friction clutch employs a sensing mechanism that detects a decrease in the free travel distance of a release yoke between engaged position and a disengaged positions. An adjustment device responsive to the sensing mechanism causes an adjusting ring to compensate for the decrease in the free travel distance traveled by the release yoke.

In a further known arrangement, an automatically adjustable friction clutch employs a compensating means disposed between a housing and a diaphragm spring. The adjustable clutch includes a biasing element that provides a supporting force that causes the diaphragm spring to engage a seat. The diaphragm spring remains tiltable about the seat and its position with respect thereto is shifted to maintain a constant release force.

Other known arrangements employ wedge mechanisms wherein the inclined surfaces thereof extend along the circumference of a spring and provide adjustment to maintain the posture of the spring. Additionally, a clutch cover assembly including a movement regulation mechanism and a moveable support member have been employed to compensate for the displacement associated with the wear of a friction member.

Although the aforementioned known self-adjusting clutches have overcome some of the problems associated with the previously mentioned non-adjustable clutches, there is still a need for improved adjustable mechanisms for clutches. Specifically, there is a need for a self-adjusting clutch that provides greater flexibility in positioning an adjustment means. This increased flexibility facilitates clutch model design and manufacture. There is also a need for a self-adjusting clutch that provides greater stability and precision regarding the operation of the diaphragm spring. Such increased stability would improve the actuation characteristics of the clutch system.

SUMMARY OF THE INVENTION

Objects of the Invention

It is an object of the present invention to provide a friction clutch that automatically adjusts for wear of the clutch disc friction surfaces.

It is another object of the present invention to provide a friction clutch that maintains a consistent release force over the life of the clutch.

It is a further object of the present invention to provide a friction clutch that accommodates clutch discs having respectively different compressed clutch facing thicknesses.

Summary of the Invention

In carrying out the above objects and other objects of the present invention, an arrangement is provided for adjusting for wear of a clutch disc of a vehicle. The clutch disc is axially interposed between a pressure plate and a flywheel of the vehicle and communicates frictionally with the pressure plate and the flywheel of the vehicle. The clutch is provided with a diaphragm spring that is pivotable about a fulcrum ring. The diaphragm spring urges the pressure plate toward the clutch disc and the flywheel. Over the life of the clutch disc, the axial relationship of the fulcrum ring with respect to the pressure plate varies. In accordance with the invention, a fulcrum support element for supporting the fulcrum ring and is axially displaceable with respect to the pressure plate. Preferably, the fulcrum support element is fixed relative to the fulcrum ring. There is additionally provided a bias actuator mechanism, or element, that is arranged to communicate with the fulcrum support element. The bias actuator mechanism establishes an axially spatial relationship between the fulcrum support element and the pressure plate. A resilient biasing element also communicates with the fulcrum support element. The resilient biasing element applies a resilient biasing force to the fulcrum support element. When a force exceeding the resilient biasing force is applied to the fulcrum support element, the bias actuator mechanism is released. When released, the bias actuator mechanism establishes a predetermined axial relationship between the fulcrum support element and the pressure plate.

In further carrying out the above objects and other objects of the present invention, a friction clutch is provided for maintaining a substantially constant release force requirement over the life of the clutch. The friction clutch of the present invention includes a cover for housing the inner components of the clutch. The cover is generally rotatable about a predetermined axis.

The clutch also includes a pressure plate, flywheel and fulcrum ring assembly. The pressure plate is non-rotatably connected to the cover. The flywheel, or other counterpressure plate, is disposed adjacent to the pressure plate. The fulcrum ring assembly is disposed between the pressure plate and the cover, and supports an axially stressed diaphragm spring.

The axially stressed diaphragm spring can be flexed between an engaged position and a disengaged position. The diaphragm spring is normally in the engaged position and requires a release force to flex from the engaged position to the disengaged position.

The clutch further includes a torque transmitting clutch disc disposed between the pressure plate and the flywheel. The surfaces of the disc that contact the pressure plate and the flywheel when the diaphragm spring is in the engaged position are known as the friction surfaces. As the clutch becomes engaged and disengaged, the friction surfaces are subject to wear as a result of the friction generated through contact with the pressure plate and the flywheel.

The clutch of the present invention finally includes an adjustment arrangement and a resilient biasing element. The adjustment arrangement is disposed between the fulcrum ring assembly and the cover. It is adapted to receive an actuating force from the diaphragm spring through the fulcrum ring assembly. Upon receiving the actuating force, the adjustment arrangement adjusts and causes the fulcrum ring assembly to move relative to the cover. This compensates for an increase in the diaphragm spring release force over the life of the clutch.

It is an advantage of the present invention to provide greater flexibility in positioning the resilient biasing element and the adjustment arrangement within the clutch cover. This advantage is possible because the adjustment arrangement and the resilient biasing element are not part of and do not directly support the fulcrum ring elements.

A further advantage of the present invention is greater stability and precision achieved due to the rigidly fixed fulcrum rings and fulcrum support plate mounted to the diaphragm spring. This increased stability and precision result in lower required bearing travels and improved pressure plate lift characteristics.

The resilient biasing element is disposed between the pressure plate and the adjustment arrangement. The resilient biasing element is resiliently flexible between a first position and a second position. The resilient biasing element is normally in the first position, but is flexed to the second position when the release force is greater than a predetermined release force. When the resilient biasing element is in the second position, it transfers the actuating force from the diaphragm spring to the adjustment arrangement.

The objects, features and advantages of the present invention are readily apparent from the following description of the preferred embodiments when taken in connection with the accompanying drawings.

BRIEF DESCRIPTION OF THE DRAWINGS

Comprehension of the invention is facilitated by reading the following detailed description, in conjunction with the annexed drawings, in which.

DETAILED DESCRIPTION

Figure 1:
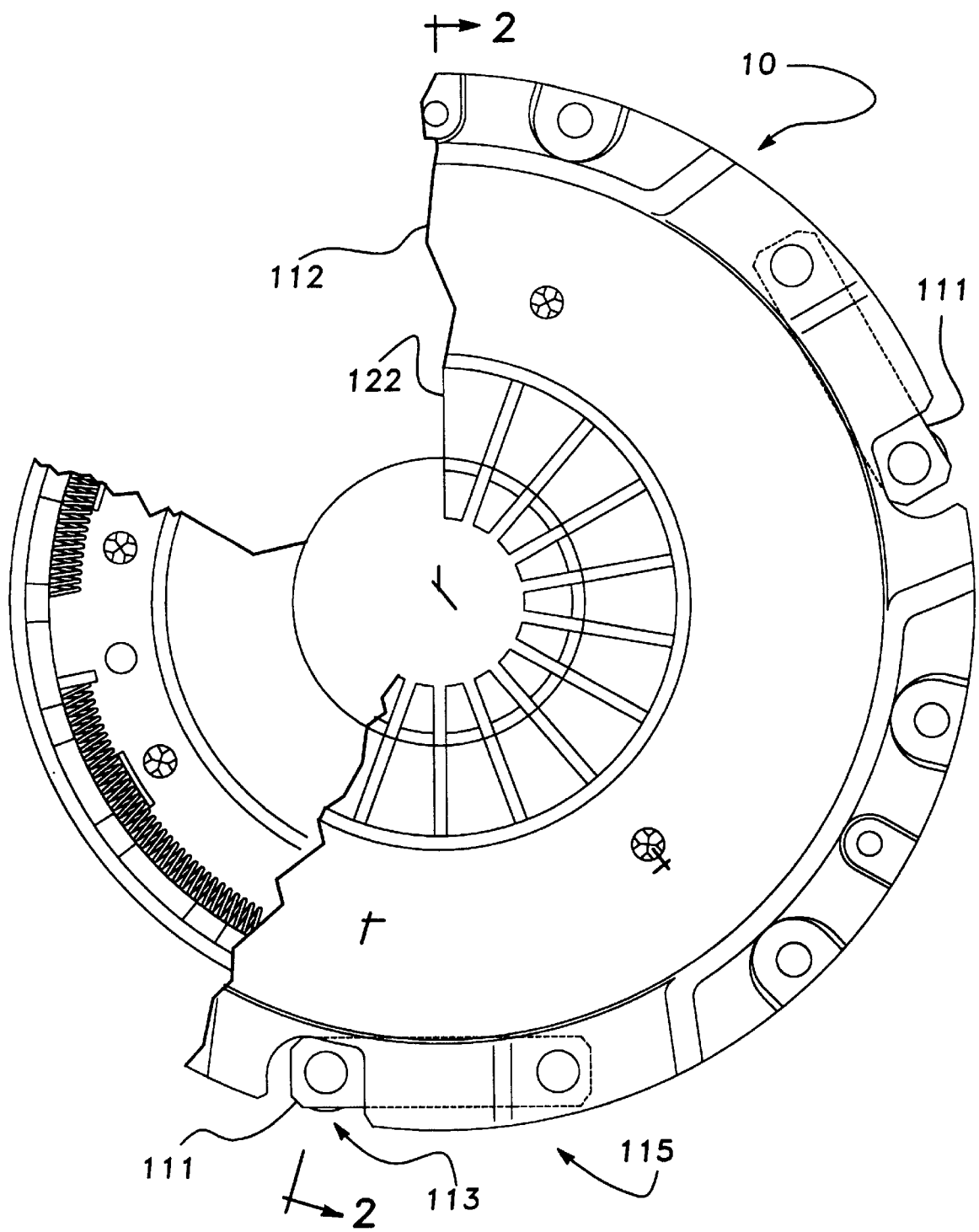
FIG. 1 is a simplified schematic, fragmentary plan representation of a wear compensating friction clutch according to the present invention.
Figure 2:
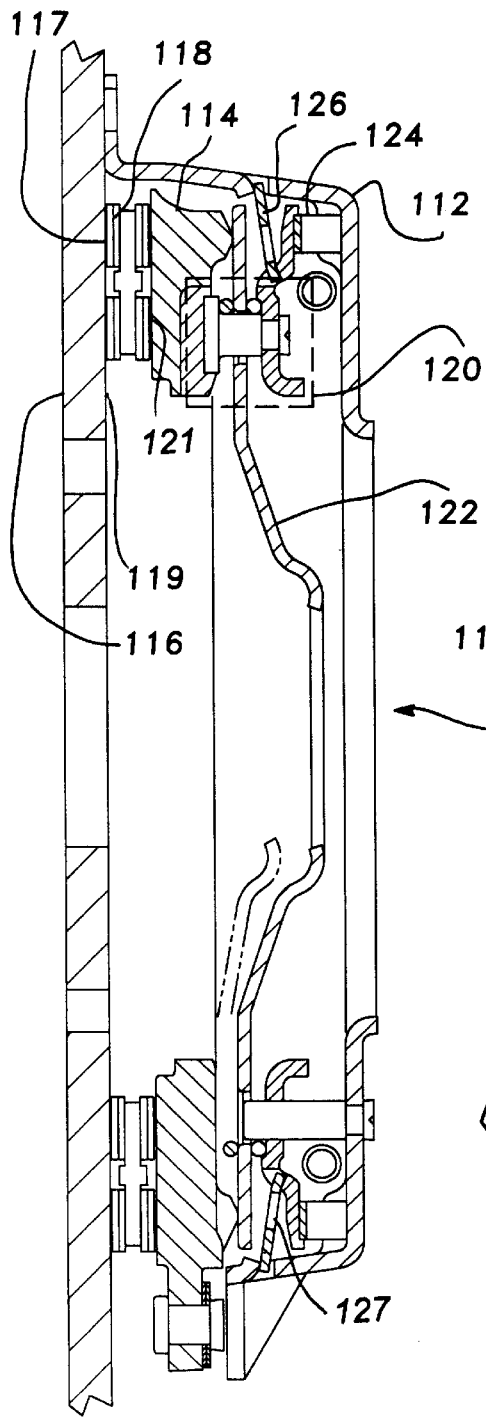
FIG. 2 is a partially cross-sectional side representation of the friction clutch of FIG. 1.

Referring now to the drawing figures, there is illustrated in FIGS. 1 and 2, a wear compensating friction clutch assembly 110 embodying the present invention. Friction clutch 110 includes a cover 112 and a pressure plate 114. Cover 112 and pressure plate 114 are non-rotatably connected to one another. A plurality of spring steel straps 111 are riveted to pressure plate 114 and cover 112 and allow limited respective axial movement of pressure plate 114 and cover 112. This type of connection is well known by those of ordinary skill in the art. Reference numeral 113 generally indicates the attachment of strap 111 to pressure plate 114. Reference numeral 115 generally indicates the attachment of strap 111 to cover 112.

FIG. 2 shows a flywheel 116 that functions as a counter-pressure plate, to be arranged parallel to pressure plate 114. A torque transmitting clutch disc or plate 118 is axially interposed between pressure plate 114 and flywheel 116. Clutch disc 118 is adapted for use in a known manner with a rotatable shaft (not shown) of a motor vehicle transmission (not shown). When clutch 110 is in an engaged state, friction surfaces 117 and 121 of clutch disc 118 communicate frictionally with surface 119 of flywheel 116 and pressure plate 114 thereby allowing a torque to be transmitted thereacross. When clutch 110 is in a disengaged state, clutch disc 118 does not communicate frictionally with flywheel 116, and the torque cannot be transmitted between flywheel 116 and clutch disc 118.

Clutch 110 is also shown in FIG. 2 to have a fulcrum ring assembly 120 disposed between pressure plate 116 and cover 112. Fulcrum ring assembly 120 supports an axially stressed diaphragm spring 122. Diaphragm spring 122 is flexible between an engaged position and a disengaged position. In order for diaphragm spring 122 to flex between the engaged and disengaged positions, a force must be applied along a center axis (not shown) of diaphragm spring 122. This force is typically referred to as the "release force."

Clutch 110 further includes a bias actuator mechanism or element 124 that functions as an adjustment arrangement and is disposed between the fulcrum ring assembly 120 and cover 112. Adjustment arrangement 124 adjusts the position of fulcrum ring assembly 120 axially relative to cover 112 to compensate for an increase in the diaphragm spring release force that would result from wear of clutch disk 118. The diaphragm spring release force typically changes over the life of a clutch due to wearing of friction surfaces 121 and 117. As these surfaces degenerate, the release force required to operate clutch 110 changes according to the graphical representations of FIGS. 5 and 6 which will be described in detail hereinbelow.

Adjustment arrangement 124 operates in response to an actuating force. The actuating force is received from diaphragm spring 122 through fulcrum ring assembly 120 as a result of flexing between the engaged and disengaged positions in a worn condition.

Clutch 110 also includes a resilient biasing element 126 that functions as an actuating element and is positioned between pressure plate 114 and cover 112. Resilient biasing element 126 is resiliently flexible between two positions. In the first position, resilient biasing element 126 transfers no relevant force to adjustment arrangement 124. In the second position, resilient biasing element 126 transfers the actuating force from diaphragm spring 122 to adjustment arrangement 124.

Upon disengagement of the clutch, resilient biasing element 126 is caused to move from the first position to the second position when the release force is greater than a predetermined release force. Such displacement of resilient biasing element 126 is responsive to its resilience characteristic which may be determined in this specific illustrative embodiment of the invention by a predetermined arrangement of apertures 127 arranged therethrough. The preferred release force of clutch 110 is between −2000N and +2000N.

Figure 3:
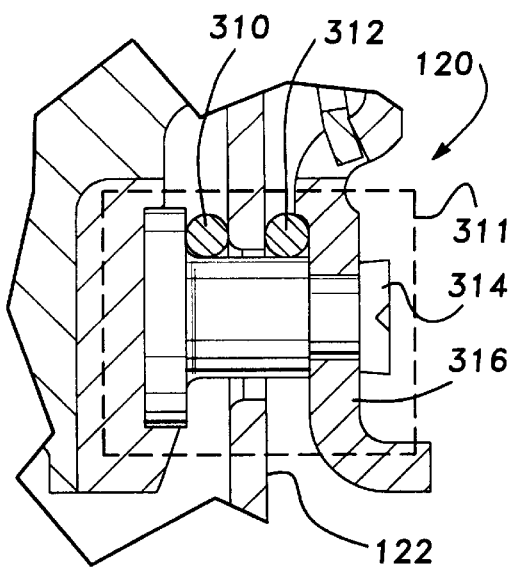
FIG. 3 is a partially cross-sectional representation of a specific illustrative embodiment of a fulcrum ring assembly constructed in accordance with the principles of the present invention.

Referring now to FIG. 3, there is illustrated a specific illustrative embodiment of a fulcrum ring assembly 120 constructed in accordance with the present invention. Preferably, fulcrum ring assembly 120 includes two fulcrum rings 310 and 312 arranged to support diaphragm spring 122 on either side thereof. Fulcrum rings 310 and 312 further function as pivots for diaphragm spring 122 upon engagement and disengagement of clutch 110.

Fulcrum rings 310 and 312 are stabilized against movement with respect to diaphragm spring 122 by a fulcrum support 311. Fulcrum support 311 preferably includes a plurality of rivets 314 and a fulcrum support plate 316. Rivets 314 hold the elements of the fulcrum ring assembly in place. As shown in FIG. 2, a fulcrum support element or plate 316 is positioned between resilient biasing element 126 and adjustment arrangement 124. At the outer periphery, resilient biasing element 126 is supported by cover 112, and at the inner periphery, resilient biasing element 126 is coupled to fulcrum support plate 316. When the release force of diaphragm spring 122 exceeds a predetermined release force, resilient biasing element 126 releases an actuating force which is transferred through fulcrum support plate 316 to adjustment arrangement 124. In an alternative embodiment, fulcrum support plate 316 may include a series of circumferentially spaced apertures to achieve a desired resilience.

Figure 4:
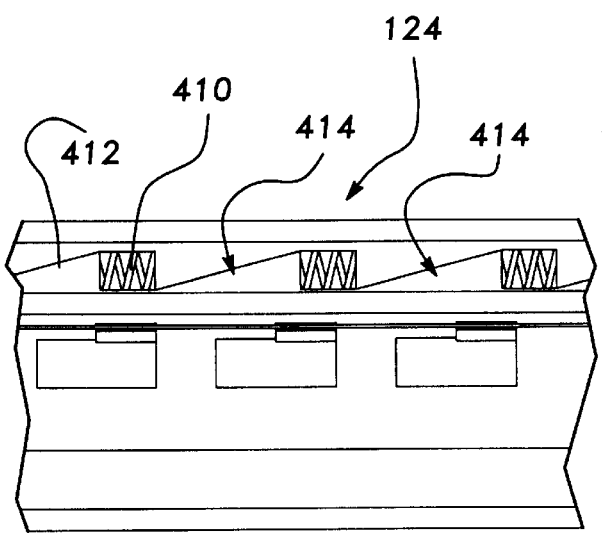
FIG. 4 is a sectional view of the preferred adjustment arrangement.

Referring now to FIG. 4, there is illustrated a sectional representation of a specific illustrative embodiment of the adjustment arrangement of the present invention. As shown, adjustment arrangement 124 includes an adjustment spring 410 and a wear compensator 412. In this particularly advantageous embodiment, wear compensator 412 is in the form of an annular ring arrangement of a plurality of inclined axial displacement surfaces or ramps 414 that respond to the urging of a stressed adjustment spring 410 to axially displace fulcrum ring assembly 120 relative to cover 112.

Figure 5:
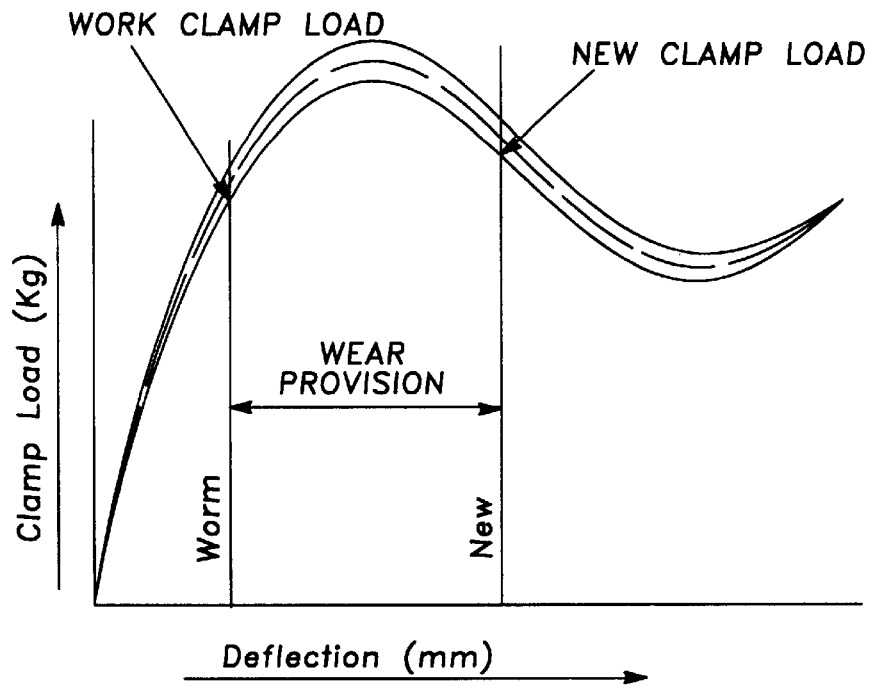
FIG. 5 is a graph of typical load deflection characteristics for a prior art clutch.

Referring now to FIG. 5, there is illustrated a graph of typical load deflection characteristics for a typical diaphragm spring indicating the wear characteristics of a non-adjustable diaphragm spring clutch. As shown, over the life of a non-adjustable diaphragm spring clutch, the clamp load can be represented by a generally bell-shaped portion of a clamp load vs. deflection curve.

Figure 6:
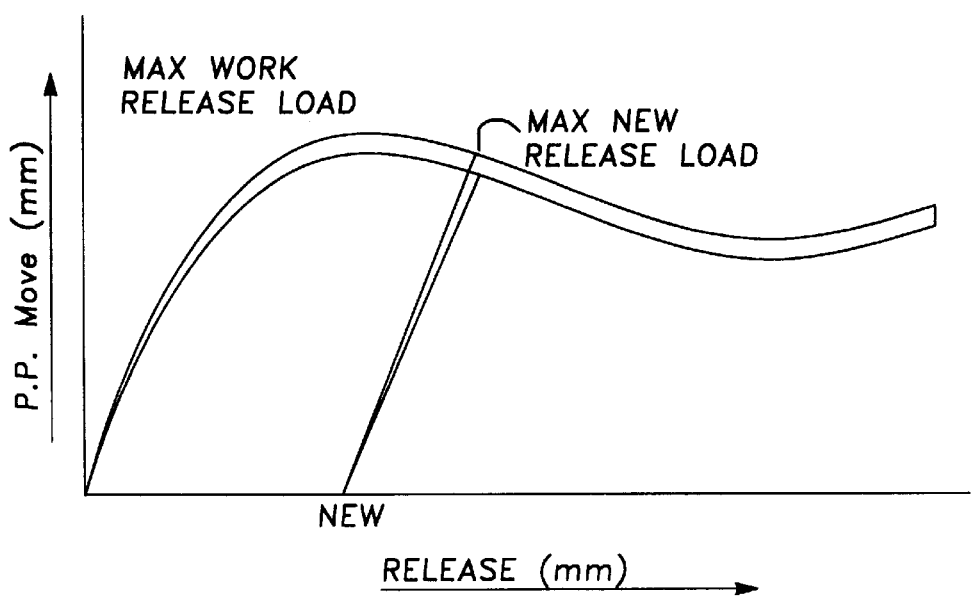
FIG. 6 is a graph of typical release characteristics for a prior art clutch.

Referring now to FIG. 6, there is illustrated a graph of typical release load characteristics for a non-adjustable diaphragm spring clutch. As shown, a typical diaphragm spring has a declining characteristic curve during disengagement. Through the normal operating range of the bias actuator mechanism a wear compensating clutch constructed in accordance with the present invention maintains this characteristic curve.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. An arrangement for adjusting for wear of a clutch disc for a vehicle, the arrangement being of the type wherein the clutch disc is interposed axially between, and communicates frictionally with, a pressure plate and a flywheel of the vehicle, the pressure plate being urged by a diaphragm spring toward the clutch disc and the flywheel, the diaphragm spring being pivotable about a fulcrum ring having an axial relationship with respect to the pressure plate that varies as the clutch disc wears, the arrangement comprising:

a fulcrum support plate for supporting the fulcrum ring in fixed relation thereto as an axial force is applied to the fulcrum ring, said fulcrum support plate being axially displaceable with respect to the pressure plate;

bias actuator means arranged to communicate with said fulcrum support plate for establishing an axially spatial relationship between said fulcrum support plate and the pressure plate; and resilient biasing means arranged to communicate directly with said fulcrum support plate for applying a resilient biasing force to said fulcrum support plate whereby when the axial force applied to said fulcrum support plate exceeds the resilient biasing force, said bias actuator means is released whereby a predetermined axial relationship between said fulcrum support plate and the pressure plate is established.

2. The arrangement of claim 1, wherein said resilient biasing means is a resilient spring ring coupled at an inner periphery thereof to said fulcrum support plate.

3. The arrangement of claim 2, wherein said resilient spring ring is coupled at an outer periphery thereof to a support element having a fixed axial relationship with respect to said bias actuator means.

4. The arrangement of claim 2, wherein said resilient spring ring is provided with a plurality of circumferentially spaced apertures therethrough for achieving a predetermined resilience characteristic of said spring ring that determines the resilient biasing force applied by said resilient biasing means to said fulcrum support plate.

5. The arrangement of claim 1, wherein there is further provided a further fulcrum ring arranged in fixed relation to said fulcrum support plate, the diaphragm spring being interposed between the fulcrum ring and said further fulcrum ring.

6. The arrangement of claim 1, wherein said bias actuator means comprises an annular ring having a plurality of axial displacement ramps formed thereon, said annular ring being arranged to rotate about an axis that is substantially parallel to a direction of displacement of said fulcrum support plate.

7. The arrangement of claim 6, wherein said bias actuator means further comprises a spring, said spring being arranged in a stressed condition for communicating a circumferential force to said annular ring.

8. The arrangement of claim 1, wherein there is further provided a rivet for maintaining the fixed relationship between said fulcrum support plate and the fulcrum ring.

9. The arrangement of claim 8, wherein said rivet maintains a fixed relationship between the diaphragm spring and the fulcrum support plate.

10. A friction clutch comprising:

a cover;

a pressure plate non-rotatably connected to said cover, a flywheel arranged parallel to said pressure plate;

a fulcrum ring assembly disposed between said pressure plate and said cover;

a diaphragm spring supported by said fulcrum ring assembly, said diaphragm spring being flexible between an engaged position and a disengaged position, said diaphragm spring requiring a release force to flex between the engaged and disengaged positions;

a torque transmitting clutch disc disposed between said pressure plate and said flywheel, said disc having friction surfaces that frictionally communicate with said pressure plate and said flywheel when said diaphragm spring is in the engaged position, the friction surfaces being subject to wear as a result of cumulative frictional communications with said pressure plate and said flywheel;

adjustment means for compensating for an increase in said diaphragm spring release force, said adjustment means being disposed between said fulcrum ring assembly and said cover, said adjustment means having a fulcrum support portion for communicating axially sequentially with said fulcrum ring assembly and being adapted to receive an actuating force from said diaphragm spring through said fulcrum ring assembly, and upon receiving the actuating force said adjustment means provides clutch adjustment by moving said fulcrum ring assembly relative to said cover; and resilient biasing means for actuating said adjustment means, said resilient biasing means being arranged to communicate with said fulcrum support portion of said adjustment means, said resilient biasing means being resiliently flexible between a first position and a second position at which said resilient biasing means transfers the actuating force from said diaphragm spring to said adjustment means, said resilient biasing means moving from the first position to the second position when the release force is greater than a predetermined release force.

11. The friction clutch of claim 10, wherein said fulcrum ring assembly includes:

a first fulcrum; and a second fulcrum;

wherein said diaphragm spring is tiltable against said first and second fulcrums.

12. The friction clutch of claim 11 wherein said fulcrum support portion of said adjustment means and said first fulcrum arranged directly in axially sequential communication with one another.

13. The friction clutch of claim 11 wherein there is further provided a rivet for stabilizing said first fulcrum and said second fulcrum to said fulcrum support portion of said adjustment means.

14. The friction clutch of claim 11, wherein said fulcrum support portion includes a fulcrum support plate adjacent to said adjustment means.

15. The friction clutch of claim 14 wherein said resilient biasing means is supported by said cover and applies an actuating force to said fulcrum support plate.

16. The friction clutch of claim 10 wherein said adjustment means includes an adjustment spring and a wear compensator, said adjustment spring disposed adjacent to the wear compensator for driving said wear compensator.

17. The friction clutch of claim 16 wherein said wear compensator comprises an annular arrangement of inclined surfaces for displacing said fulcrum ring assembly relative to said cover.

18. The friction clutch of claim 10 wherein said diaphragm spring has a declining characteristic load curve during clutch disengagement in the normal operating range of said adjustment means.

19. The friction clutch of claim 10 wherein said resilient biasing means maintains a defined load range relative to a selected diaphragm load response characteristic.

20. The friction clutch of claim 10 wherein the optimal release force of said diaphragm spring is between −2000N and +2000N.

21. The friction clutch of claim 10 wherein said resilient biasing means includes an energy storing device providing a biasing force between said fulcrum ring assembly and said cover.

* * * * *